(12) United States Patent
Noles et al.

(10) Patent No.: US 8,428,972 B1
(45) Date of Patent: Apr. 23, 2013

(54) SYSTEMS AND METHODS FOR PROVIDING UMBRELLA INSURANCE POLICIES

(75) Inventors: Kevin M. Noles, Fair Oaks Ranch, TX (US); Leticia Y. Hinojosa, San Antonio, TX (US); Marilyn A. Dworacyk, Poth, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 482 days.

(21) Appl. No.: 12/474,585

(22) Filed: May 29, 2009

(51) Int. Cl.
*G06Q 40/00* (2012.01)

(52) U.S. Cl.
USPC .................................. 705/4; 705/35; 705/37

(58) Field of Classification Search ............... 705/4
See application file for complete search history.

(56) References Cited

U.S. PATENT DOCUMENTS

| | | | | |
|---|---|---|---|---|
| 4,831,526 A * | 5/1989 | Luchs et al. | ................. | 705/4 |
| 4,903,201 A * | 2/1990 | Wagner | ................. | 705/37 |
| 4,980,826 A * | 12/1990 | Wagner | ................. | 705/37 |
| 7,162,447 B1 * | 1/2007 | Cushing | ................. | 705/37 |
| 7,430,533 B1 * | 9/2008 | Cushing | ................. | 705/37 |
| 7,716,121 B2 * | 5/2010 | Walsky et al. | ................. | 705/37 |
| 7,729,978 B2 * | 6/2010 | Mintz et al. | ................. | 705/37 |
| 7,752,116 B2 * | 7/2010 | Ascher et al. | ................. | 705/37 |
| 7,765,137 B1 * | 7/2010 | Adcock et al. | ................. | 705/35 |
| 7,797,226 B2 * | 9/2010 | Ram et al. | ................. | 705/37 |
| 7,840,477 B2 * | 11/2010 | Claus et al. | ................. | 705/37 |
| 7,856,392 B1 * | 12/2010 | Fishbain et al. | ............ | 705/36 R |
| 7,856,393 B1 * | 12/2010 | Fishbain et al. | ............ | 705/36 R |
| 7,865,422 B2 * | 1/2011 | Lutnick et al. | ................. | 705/37 |
| 7,873,544 B2 * | 1/2011 | Adcock et al. | ................. | 705/26.8 |
| 7,873,561 B1 * | 1/2011 | Adcock et al. | ................. | 705/37 |
| 2002/0194033 A1 | 12/2002 | Huff | | |
| 2003/0004853 A1 * | 1/2003 | Ram et al. | ................. | 705/37 |
| 2004/0088242 A1 * | 5/2004 | Ascher et al. | ................. | 705/37 |
| 2004/0148201 A1 | 7/2004 | Smith et al. | | |
| 2005/0197953 A1 | 9/2005 | Broadbent et al. | | |
| 2006/0167789 A1 * | 7/2006 | Tilly et al. | ................. | 705/37 |
| 2006/0218071 A1 * | 9/2006 | Sweeting | ................. | 705/37 |
| 2007/0067735 A1 * | 3/2007 | Hawley et al. | ................. | 715/792 |
| 2007/0130204 A1 * | 6/2007 | Seelig et al. | ................. | 707/104.1 |
| 2008/0140559 A1 * | 6/2008 | Ram et al. | ................. | 705/37 |
| 2008/0154651 A1 * | 6/2008 | Kenefick et al. | ................. | 705/4 |
| 2010/0082473 A1 * | 4/2010 | Smith et al. | ................. | 705/37 |
| 2010/0145874 A1 * | 6/2010 | Janowski | ................. | 705/36 R |
| 2010/0332379 A1 * | 12/2010 | Ram et al. | ................. | 705/37 |

OTHER PUBLICATIONS

Rakovska, Gergana: "E-Commerce Business Models for Insurance: Application to U.S. and European Markets", Center for Risk Management and Insurance Research, Georgia State University, Jul. 5, 2001, pp. 1-48.

* cited by examiner

*Primary Examiner* — Hai Tran
(74) *Attorney, Agent, or Firm* — Brooks, Cameron & Huebsch, PLLC (57) ABSTRACT

A system implemented on one or more computer processors for providing an umbrella insurance policy may comprise at least one subsystem configured for collecting information regarding a customer's household, at least one subsystem configured for automatically accessing existing underlying insurance policy records of the customer, and at least one subsystem configured for automatically deciding a disposition of the customer's umbrella policy application based on the information collected regarding the customer's household and information from the automatically accessing of the customer's existing underlying insurance policy records.

32 Claims, 8 Drawing Sheets

SYSTEMS AND METHODS FOR PROVIDING UMBRELLA INSURANCE POLICIES

BACKGROUND

Umbrella insurance refers to an insurance policy that protects the assets and future income of the policyholder above and beyond the standard limits set on their primary (i.e., underlying) insurance policies. Typically, an umbrella policy is pure liability coverage over and above the coverage afforded by the underlying policy, and is sold in increments of one million dollars. The term "umbrella" is used because it covers liability claims from all policies underneath it, such as automobile and homeowner's policies. For example, if one has an automobile insurance policy with liability limits of $500,000 and a homeowner's policy with a limit of $300,000, then with a million dollar umbrella insurance policy, one's limits become in effect, $1,500,000 on the automobile policy and $1,300,000 on a homeowners liability claim. Umbrella insurance may also provide coverage for claims that may be excluded by the primary policies often including, but not limited to: false arrest, libel, slander, and invasion of privacy.

While umbrella policies have long been thought of as coverage only needed by the very rich, it is becoming more and more apparent that everyone should have an umbrella policy. However, currently, no systems or methods exist for a customer to apply for and be issued an umbrella policy using a convenient automated process. Also, many current umbrella insurance product and pricing structures are very antiquated with many of the policy processes being performed manually. For example, typically, approximately 50% of the umbrella insurance policy renewals require manual intervention by a customer service representative and most adjustments to umbrella insurance policies are often performed at time of policy renewal instead of mid-term due to the manual process required.

In this regard, there is a need for systems and methods that overcome the shortcomings described above and others.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In consideration of the above-identified shortcomings of the art, systems and methods for providing an umbrella insurance policies are described herein. For several embodiments, a system implemented on one or more computer processors for providing an umbrella insurance policy may comprise at least one subsystem configured for collecting information regarding a customer's household, at least one subsystem configured for automatically accessing existing underlying insurance policy records of the customer, and at least one subsystem configured for automatically deciding a disposition of the customer's umbrella policy application based on the information collected regarding the customer's household and information from the automatically accessing of the customer's existing underlying insurance policy records.

Other features and embodiments are described below.

BRIEF DESCRIPTION OF THE DRAWINGS

Systems and methods providing umbrella insurance policies are further described with reference to the accompanying drawings in which.

DETAILED DESCRIPTION

Certain specific details are set forth in the following description and figures to provide a thorough understanding of various embodiments. Certain well-known details often associated with computing and software technology are not set forth in the following disclosure to avoid unnecessarily obscuring the various embodiments. Further, those of ordinary skill in the relevant art will understand that they can practice other embodiments without one or more of the details described below. Finally, while various methods are described with reference to steps and sequences in the following disclosure, the description as such is for providing a clear implementation of various embodiments, and the steps and sequences of steps should not be taken as required to practice the embodiments.

Figure 1:
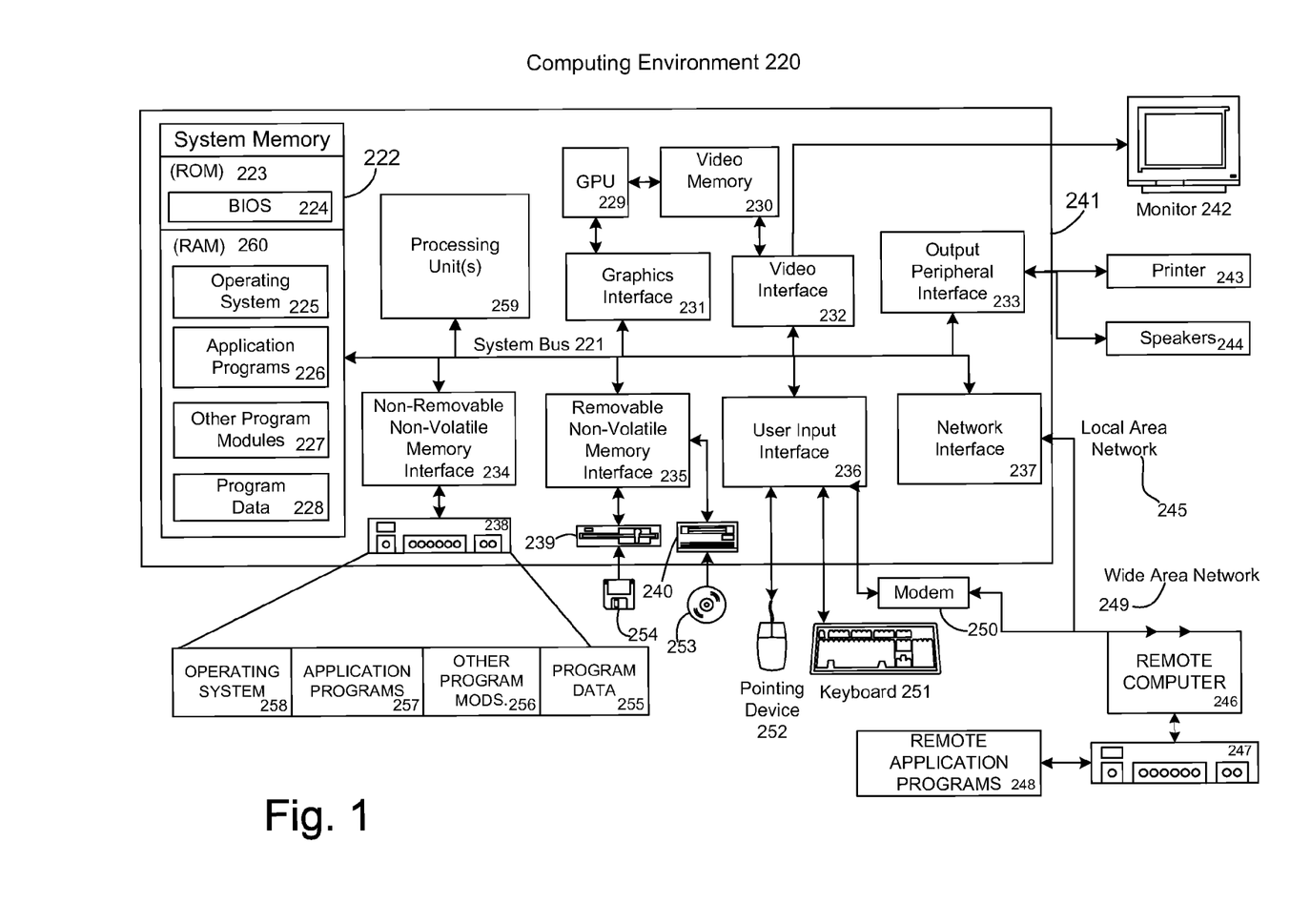
FIG. 1 is a block diagram representing an exemplary computing environment suitable for use in conjunction with implementing systems and methods providing umbrella insurance policies.

Referring next to FIG. 1, shown is a block diagram representing an exemplary computing environment suitable for use in conjunction with implementing the processes described below. For example, the computer-executable instructions that carry out the processes and methods for providing umbrella insurance policies may reside and/or be executed in aspects of such a computing environment as shown in FIG. 1. The computing environment 220 is only one example of a suitable computing environment and is not intended to suggest any limitation as to the scope of use or functionality of the embodiments. Neither should the computing environment 220 be interpreted as having any dependency or requirement relating to any one or combination of components illustrated in the exemplary computing environment 220. For example a mobile device may also include one or more items such as those described below for use in conjunction with implementing the processes described below.

Aspects of the embodiments are operational with numerous other general purpose or special purpose computing environments or configurations. Examples of well known computing systems, environments, and/or configurations that may be suitable for use with the embodiments include, but are not limited to, personal computers, server computers, handheld or laptop devices, multiprocessor systems, microprocessor-based systems, set top boxes, programmable consumer electronics, network PCs, minicomputers, mainframe computers, distributed computing environments that include any of the above systems or devices, and the like.

Aspects of the embodiments may be implemented in the general context of computer-executable instructions, such as program modules, being executed by a computer. Generally, program modules include routines, programs, objects, components, data structures, etc. that perform particular tasks or implement particular abstract data types. Aspects of the embodiments may also be practiced in distributed computing environments where tasks are performed by remote processing devices that are linked through a communications network. In a distributed computing environment, program modules may be located in both local and remote computer storage media including memory storage devices.

An exemplary system for implementing aspects of the embodiments includes a general purpose computing device in the form of a computer 241. Components of computer 241 may include, but are not limited to, a processing unit 259, a system memory 222, a graphics interface 231, a graphics processing unit (GPU) 229, video memory 230, video interface 232 and a system bus 221 that couples various system components including the system memory 222 to the processing unit 259. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 241 typically includes a variety of computer readable media. Computer readable media can be any available media that can be accessed by computer 241 and include both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, random access memory (RAM), read-only memory (ROM), Electrically Erasable Programmable Read-Only Memory (EEPROM), flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 241. Communication media typically embody computer readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared and other wireless media. Combinations of the any of the above should also be included within the scope of computer readable media.

The system memory 222 includes computer storage media in the form of volatile and/or nonvolatile memory such as ROM 223 and RAM 260. A basic input/output system (BIOS) 224, containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 1 illustrates operating system 225, application programs 226, other program modules 227, and program data 228.

The computer 241 may also include other removable/non-removable, volatile/nonvolatile computer storage media. By way of example only, FIG. 1 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through a non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 1 provide storage of computer readable instructions, data structures, program modules and other data for the computer 241. In FIG. 1, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus 221, but may be connected by other interface and bus structures, such as a parallel port, game port or a universal serial bus (USB). A monitor 242 or other type of display device is also connected to the system bus 221 via an interface, such as a video interface 232. In addition to the monitor 242, computer 241 may also include other peripheral output devices such as speakers 244 and printer 243, which may be connected through an output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 1. The logical connections depicted in FIG. 1 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device 247. By way of example, and not limitation, FIG. 1 illustrates remote application programs 248 as residing on the remote memory storage device 247. It will be appreciated that the network connections shown are exemplary and other means of establishing a communications link between the computers may be used.

It should be understood that the various techniques described herein may be implemented in connection with hardware or software or, where appropriate, with a combination of both. As used herein a "system" or "subsystem" may comprise one or more of, or any combination of, the following: mechanical devices, hardware, components of hardware, circuits, circuitry, logic design, logical components, software, software modules, components of software or software modules, software procedures, software instructions, software routines, software objects, software functions, software classes, software programs, files containing software, etc., to perform the intended function of the system or subsystem. Thus, the methods and apparatus of the embodiments, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the embodiments. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the embodiments, e.g., through the use of an application programming interface (API), reusable controls, or the like. Such programs are preferably implemented in a high level procedural or object-oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the embodiments in the context of one or more stand-alone computer systems, the embodiments are not so limited, but rather may be implemented in connection with any computing environment, such as a network or distributed computing environment. Still further, aspects of the embodiments may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

Figure 2:
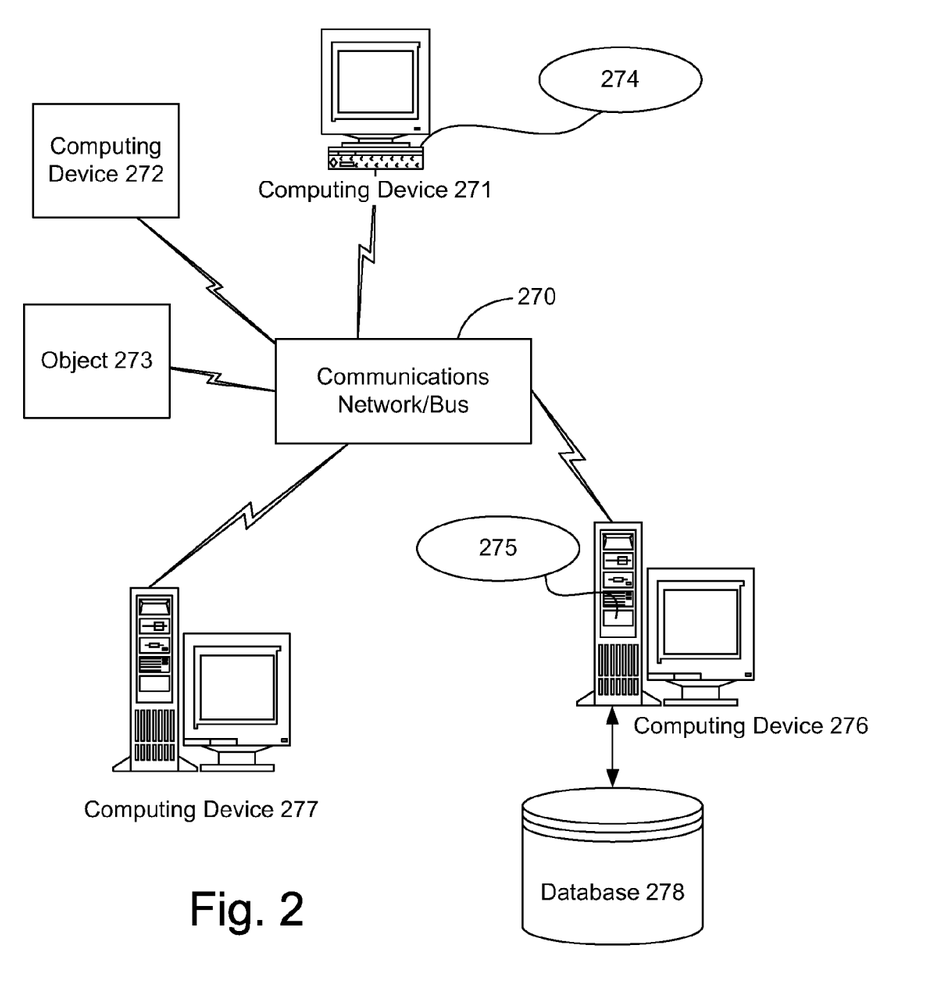
FIG. 2 illustrates an exemplary networked computing environment in which many computerized processes may be implemented to provide umbrella insurance policies.

Referring next to FIG. 2, shown is an exemplary networked computing environment in which many computerized processes may be implemented to perform the processes described below. For example, various clients on the network of FIG. 2 may be using and/or implementing systems and methods providing umbrella insurance policies in a distributed computing environment. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 2 provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as PDAs, audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network 270. In this regard, any entity may be responsible for the maintenance and updating of a database 278 or other storage element.

This network 270 may itself comprise other computing entities that provide services to the system of FIG. 2, and may itself represent multiple interconnected networks. In accordance with aspects of the embodiments, each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 2 and the further diversification that can occur in computing in a network environment such as that of FIG. 2, the systems and methods provided herein cannot be construed as limited in any way to a particular computing architecture. Instead, the embodiments should be construed in breadth and scope in accordance with the appended claims.

Figure 3:
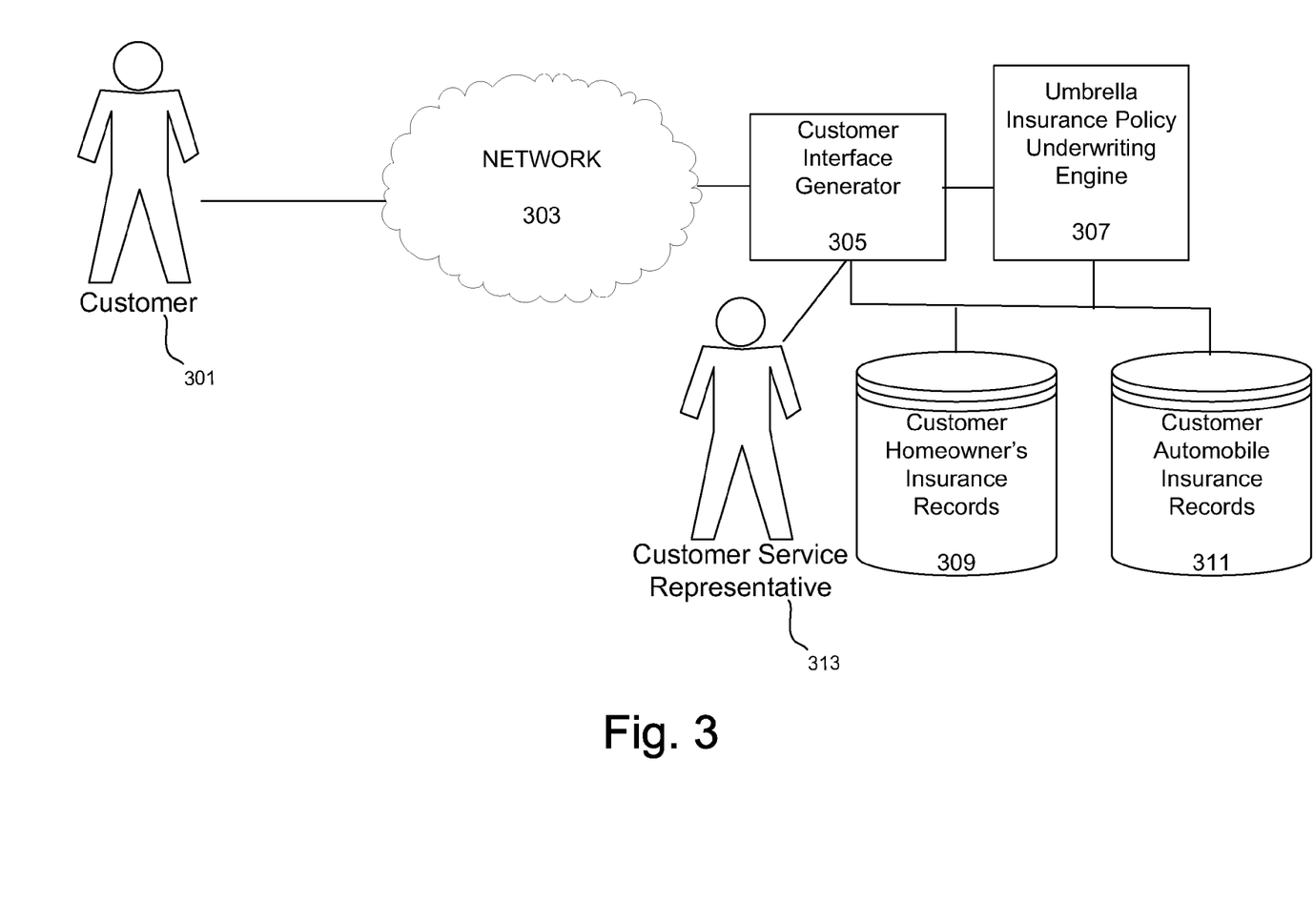
FIG. 3 is a block diagram of an example system for providing umbrella insurance policies.

Referring next to FIG. 3 shown is a block diagram of an example system for providing umbrella insurance policies. Shown are an example customer 301, network 303, customer interface generator 305, example customer service representative 313, umbrella insurance underwriting engine 307, customer homeowner's insurance records database 309, and customer automobile insurance records database 311. The customer interface generator 305 and example customer 301 are operably connected to each other through the network 303 such that they may be in remote communication with each other. The customer 301 may be operably connected to the network 303 via a personal computer or one or more mobile devices. A mobile device as described herein may include, but is not limited to, one or a combination of the following types of wireless devices: cellular phone, smart phone, satellite phone, personal digital assistant (PDA), mobile computing devices, handheld computers, and other mobile communication devices The network 303 may be one or a combination of the following types of networks: computer communications network, the Internet, an intranet, data communications network, close or long range wireless network, satellite network, cellular network, telephone network, radio network, etc. The customer interface generator 305 is operable for providing an interface to the customer for electronically interacting with the umbrella insurance policy underwriting engine 307 in order to obtain an umbrella insurance quote and be issued an umbrella insurance policy. For example, the customer interface generator 305 may generate interactive web pages to be presented to the customer over the network 303, which may be the Internet. The umbrella insurance policy underwriting engine 307 is in operable communication with the customer interface generator 305 over a computer network, for example.

The umbrella insurance policy underwriting engine 307 and customer interface generator 305 may also be in operable communication with and/or be operably connected to the customer homeowner's insurance records database 309 and the customer automobile insurance records database 311 via a computer network, for example. In one embodiment, the customer interface generator 305, customer homeowner's insurance records database 309 and the customer automobile insurance records database 311 are all connected to a network controlled or operated by an insurance company. In addition to the customer homeowner's insurance records database 309, there may be other insurance records databases having data on fire insurance, renter's insurance, etc, connected to a network controlled or operated by the insurance company.

The insurance company may provide a variety of insurance products to the customer 301 such as homeowner's, automobile, personal property, liability and umbrella insurance products and the customer 301 may be a new or existing customer of the insurance company. If the customer is an existing customer, then the customer homeowner's insurance records database 309 and the customer automobile insurance records database 311 may have existing data on the customer's current and past insurance policies with the insurance company as well as other customer data. However, the customer homeowner's insurance records database 309 and the customer automobile insurance records database 311 may also be those of a different insurance company to which the umbrella insurance policy underwriting engine has access.

The customer service representative 313 is also in operable communication with the customer interface generator 305. Thereby, the customer service representative 313 has access to and can interact with the same or similar interface generated by the customer interface generator 305 as that for the customer 301. Essentially the customer service representative 313 will be able to monitor the customer's interactions with the interface generated by the customer interface generator 305 and interact with the interface in a similar manner to provide assistance to the customer 301 and intervene in the automated processes for providing umbrella insurance policies to the customer 301 as needed.

Figure 4:
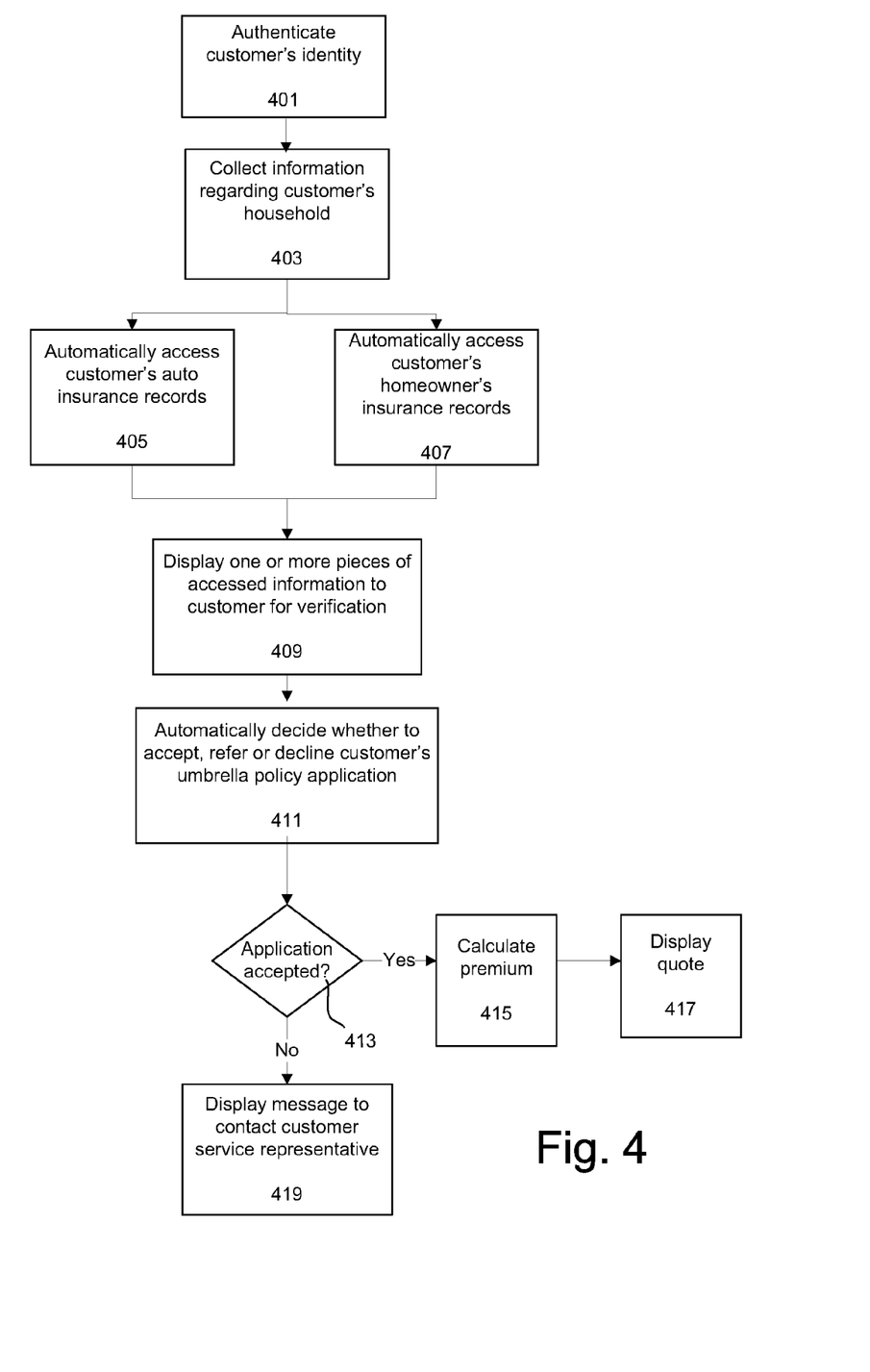
FIG. 4 is a flowchart illustrating an example process for providing a quote in a process for providing umbrella insurance policies.

Referring next to FIG. 4, shown is a flowchart illustrating an example process for providing a quote in a process for providing umbrella insurance policies. A customer such as that customer 301 of FIG. 3, for example, may electronically access an interface for providing umbrella insurance policies. The interface may be generated by a customer interface generator such as that in FIG. 3, for example. If an existing customer, the customer's identity may be authenticated 401 through the generated interface. Information is then collected 403 regarding the customer's household for purposes of issuing an umbrella policy quote. This information may be collected through the electronic interface (e.g., a web interface) and may include, but is not limited to, one or more of the following types of information: age of people within the customer's household, credit score of the customer, insurance credit score of the customer, number of products the customers holds with the insurance company, how long the customer has been a customer of the insurance company, exposures of the customer regarding their underlying insurance coverage, vehicles in storage of the customer, farm exposure of the customer, animal liability of the customer, information regarding oil tanks of the customer, vehicles or properties of the customer used in business, driving record of the customer and others in the customer's household, information regarding litigation the customer has been involved in, open or closed liability claims against the customer, claims history of customer's automobile, homeowner's, renter's, fire, watercraft and umbrella insurance, number of rental properties of the customer, whether the customer races vehicles or watercraft, whether there is unsupervised use of motorized watercraft by minors, information regarding the ownership or use of high-powered boats, information regarding non-owned automobile of the customer, whether the customer or customer's household member is high profile or high social status, information regarding dog breeds within the household, information regarding swimming pools of the customer, information regarding trampolines of the customer, and information regarding an underwriting relationship of the customer to the insurance company providing the quote. The underwriting relationship of the customer may be at different levels depending on the history the customer has with the insurance company previously underwriting insurance policies for the customer. The information listed above may be collected by questions presented to the customer in an automated fashion such as on a web page interface wherein the customer may provide answers on the same web page interface. Also, the information above may be automatically retrieved from existing customer records as well.

If the customer is an existing customer, the customer's existing automobile and homeowner's insurance records are then automatically accessed 405 407 and one or more pieces of accessed information are automatically displayed 409 to the customer for verification. The displayed information may include, but is not limited to, information regarding existing insured vehicles, homes, other insured property, coverage amounts, and information regarding existing insurance policies. The customer may then update, change or add information as applicable. If the customer is not an existing customer, they may be allowed to add vehicles, homes or other pieces of property via the same interface to obtain underlying coverage.

It may then be automatically decided 411 whether to accept, refer or decline the customer's umbrella policy application based on a number of factors including the information gathered from the customer and accessed in the existing records of the customer and other criteria explained further below in reference to FIG. 6. The automatic decision process may, for example, be performed by the Umbrella Insurance Policy Underwriting Engine 307 shown in FIG. 3. It is then automatically determined 413 whether the application has been accepted. If it has been accepted, then a premium may be automatically calculated 415 and a quote automatically displayed 417 based on the calculated premium. If the application is not accepted (i.e., either declined or deferred) a message may be automatically displayed 419 to the customer to contact a customer service representative at a given phone number. The automated process for calculating 415 the premium may, for example, be performed by the Umbrella Insurance Policy Underwriting Engine 307 shown in FIG. 3. An example automated process for calculating 415 the premium is described further with reference to FIG. 7 below.

Figure 5:
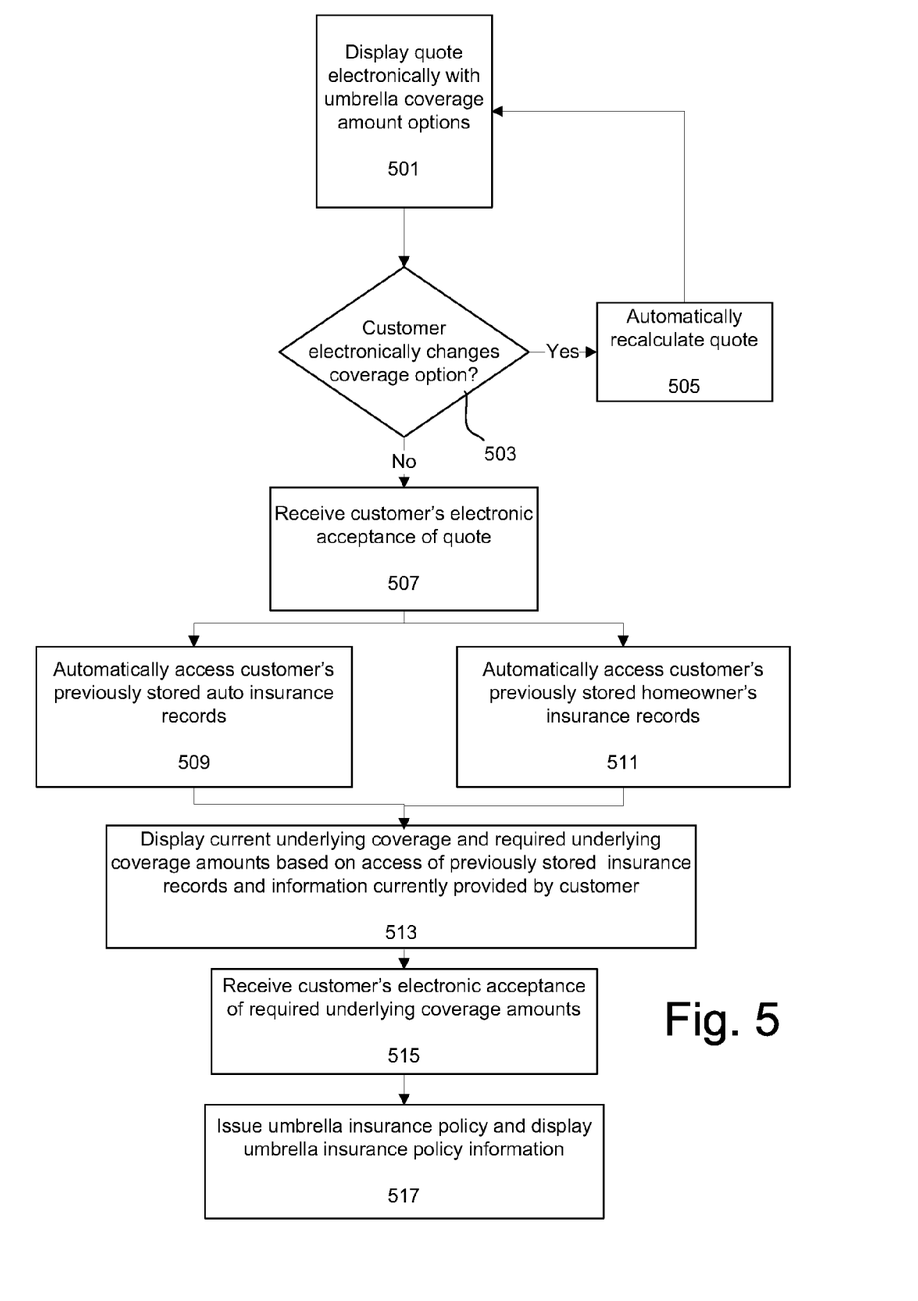
FIG. 5 is a flowchart illustrating an example process for issuing an umbrella insurance policy based on a quote provided according to the process shown in FIG. 4.

Referring next to FIG. 5, shown is a flowchart illustrating an example process for issuing an umbrella insurance policy based on a quote provided according to the process shown in FIG. 4. First, a quote is electronically displayed with umbrella coverage amount options. For example, a quote may be displayed for $1,000,000 of coverage, but the customer may be given options to see what the quote would be for other coverage amounts (such as 2, 3, 4, or 5 million dollars of coverage, for example). It is then determined whether the customer selected to change the amount of coverage. If the customer did change the coverage amount (e.g., by selecting 2 million dollars of coverage in a drop-down menu), then the quote is automatically recalculated 505 according to the selected coverage amount. In one embodiment, the quote calculations for a plurality of optional amounts of coverage would be calculated ahead of time during the calculation of the initial coverage amount so that the quote calculations could be immediately displayed when the corresponding amount of coverage is selected.

Next, the customer's electronic acceptance of the quote may be received 507 (e.g., initiated by the customer clicking on an "accept" or "next" button) and the customer's existing automobile and homeowner's insurance records are automatically accessed 509 511. The current underlying coverage and required underlying coverage amounts may then be displayed 513. The current underlying coverage amounts are those amounts of underlying insurance coverage retrieved from the accessed automobile and homeowner's insurance records of the customer. The required underlying coverage amounts are those which the customer is required to maintain in order to keep the umbrella policy in effect. An electronic acceptance may be received 515 from the customer of the required underlying coverage amounts and then the umbrella insurance policy may be automatically issued 517 and the umbrella policy information displayed to the customer.

Figure 6:
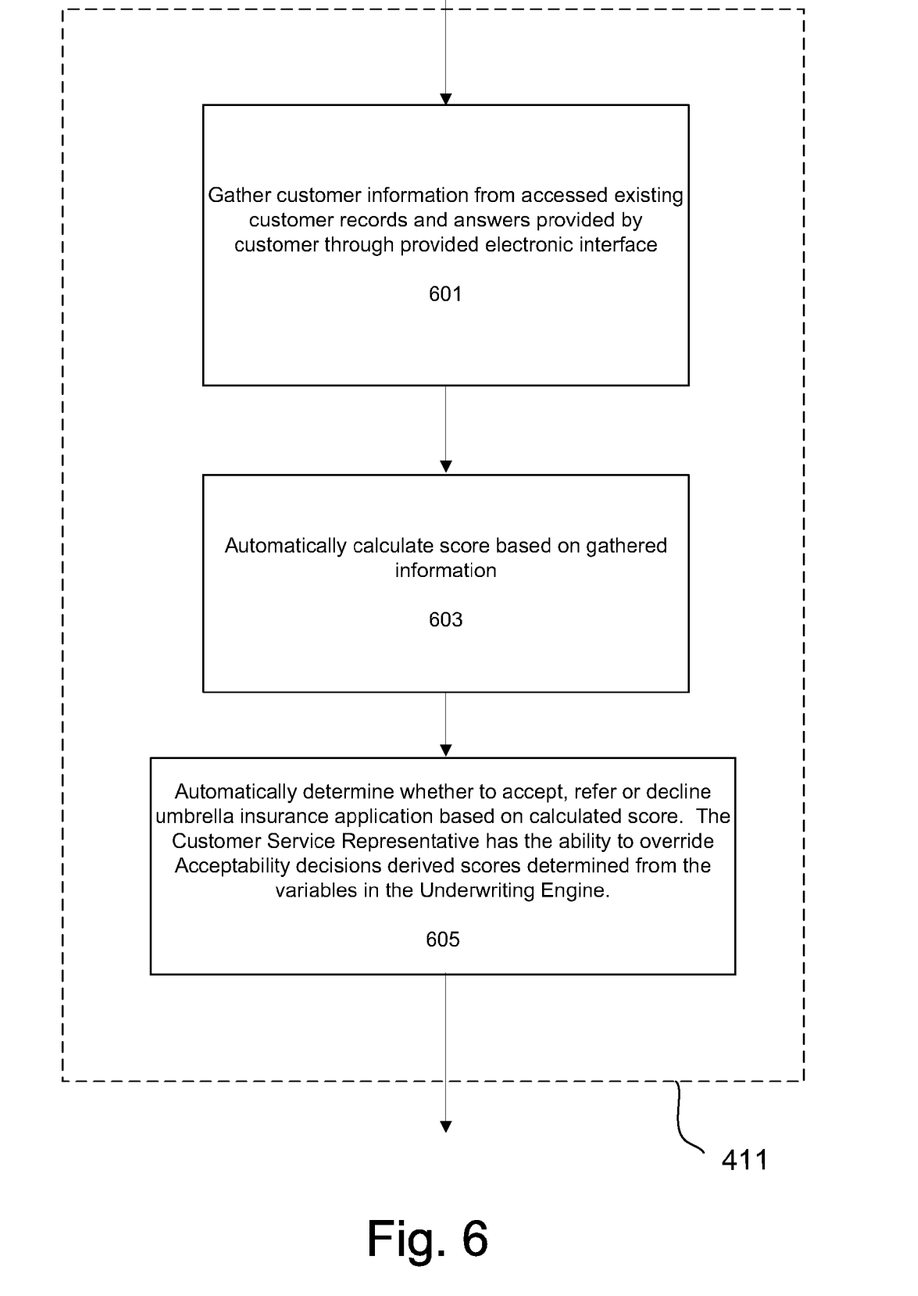
FIG. 6 is a flowchart illustrating an example process for determining whether to accept, defer or decline an application for an umbrella insurance policy according to the process shown in FIG. 4.

Referring next to FIG. 6, shown is a flowchart illustrating an example process for determining 411 whether to accept, defer or decline an application for an umbrella insurance policy according to the process shown in FIG. 4. First, customer information is automatically gathered 601 from accessed existing customer records and answers provided by the customer through the provided electronic interface (e.g., a web interface). This information may include, but is not limited to, one or more of the following: age of people within the customer's household, credit score of the customer, insurance credit score of the customer, number of products the customers holds with the insurance company, how long the customer has been a customer of the insurance company, exposures of the customer regarding their underlying insurance coverage, vehicles in storage of the customer, farm exposure of the customer, animal liability of the customer, information regarding oil tanks of the customer, vehicles or properties of the customer used in business, driving record of the customer and others in the customer's household, information regarding litigation the customer has been involved in, open or closed liability claims against the customer, claims history of customer's automobile, homeowner's, renter's, fire, watercraft and umbrella insurance, number of rental properties of the customer, whether the customer races vehicles or watercraft, whether there is unsupervised use of motorized watercraft by minors, information regarding the ownership or use of high-powered boats, information regarding non-owned automobile of the customer, whether the customer or customer's household member is high profile or high social status, information regarding dog breeds within the household, information regarding swimming pools of the customer, information regarding trampolines of the customer, and information regarding an underwriting relationship of the customer to the insurance company providing the quote. The underwriting relationship of the customer may be at different levels depending on the history the customer has with the insurance company previously underwriting insurance policies for the customer.

A customer score is then automatically calculated 603 based on the gathered information. The score may be calculated 603, for example by providing different values to the different pieces of information listed above as they are applicable to the particular customer and adding those values together to obtain a total score. It is then automatically determined 605 whether to accept, refer or decline umbrella insurance application based on calculated score. For example, if the customer score is below or above a certain value, then an automatic decision may be made to refer the application for further underwriting review. Also, for example, if the customer score is below or above a different certain value, then an automatic decision may be made to decline the application. The automated process described for determining 411 whether to accept, defer or decline an application for an umbrella insurance policy may be performed, for example, by the umbrella insurance policy underwriting engine shown in FIG. 3. Also, The Customer Service Representative (313) has the ability to override Acceptability decisions derived scores determined from the variables in the Underwriting Engine (411).

Figure 7:
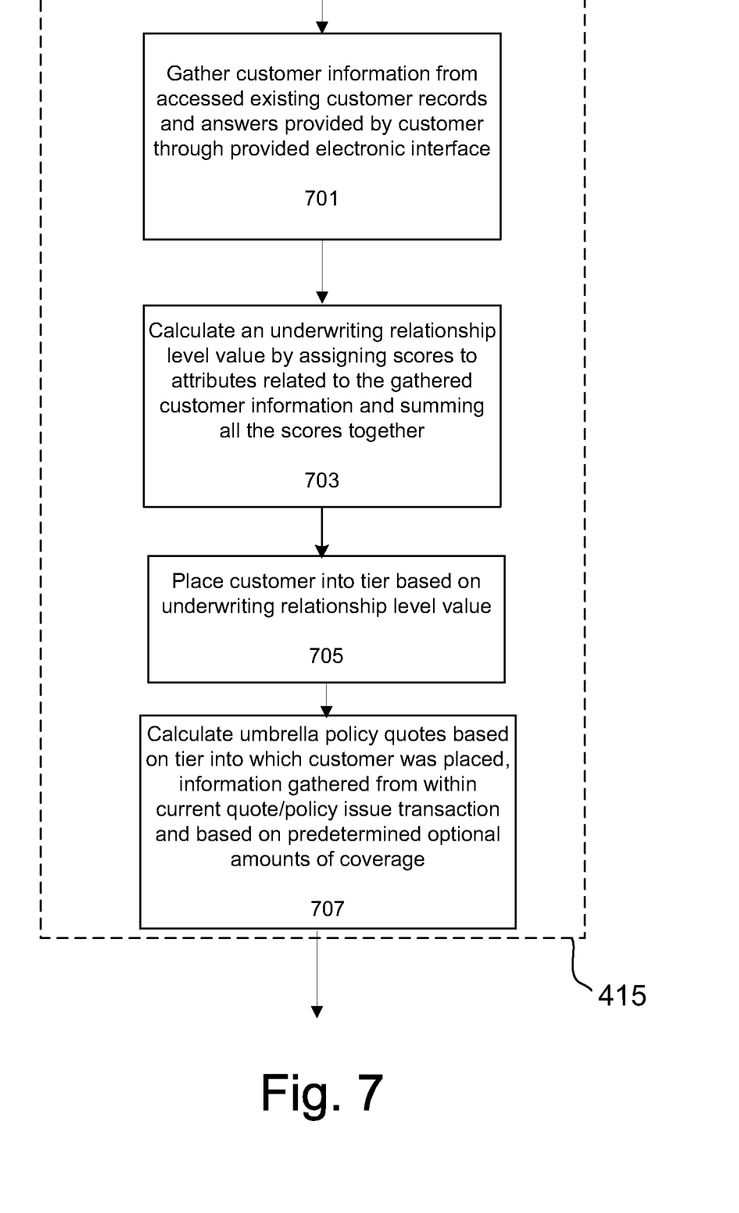
FIG. 7 is a flowchart illustrating an example process for calculating a quote for an umbrella insurance policy according to the process shown in FIG. 4.

Referring next to FIG. 7, shown is a flowchart illustrating an example process for calculating 415 a premium quote for an umbrella insurance policy according to the process shown in FIG. 4. First, customer information is automatically gathered 701 from accessed existing customer records and answers provided by the customer through the provided electronic interface (e.g., a web interface). This information may include, but is not limited to, one or more of the following: insurance credit score, military status, military commission source, military rank, collateral of the customer held by the insurance company providing the quote or bank associated with the insurance company providing the quote, prior auto insurance lapses, umbrella insurance tenure with the insurance company providing the quote, auto insurance tenure with the insurance company providing the quote, and whether the customer owns a home.

An underwriting relationship level value of the customer may then automatically calculated 703 by assigning scores to attributes related to the gathered customer information above and summing all the scores together. Next, the customer may automatically be placed 705 into a tier based on the calculated underwriting relationship level value. Finally, umbrella policy quotes are automatically calculated 707 based on the tier into which customer was placed and based on predetermined optional amounts of coverage.

Figure 8:
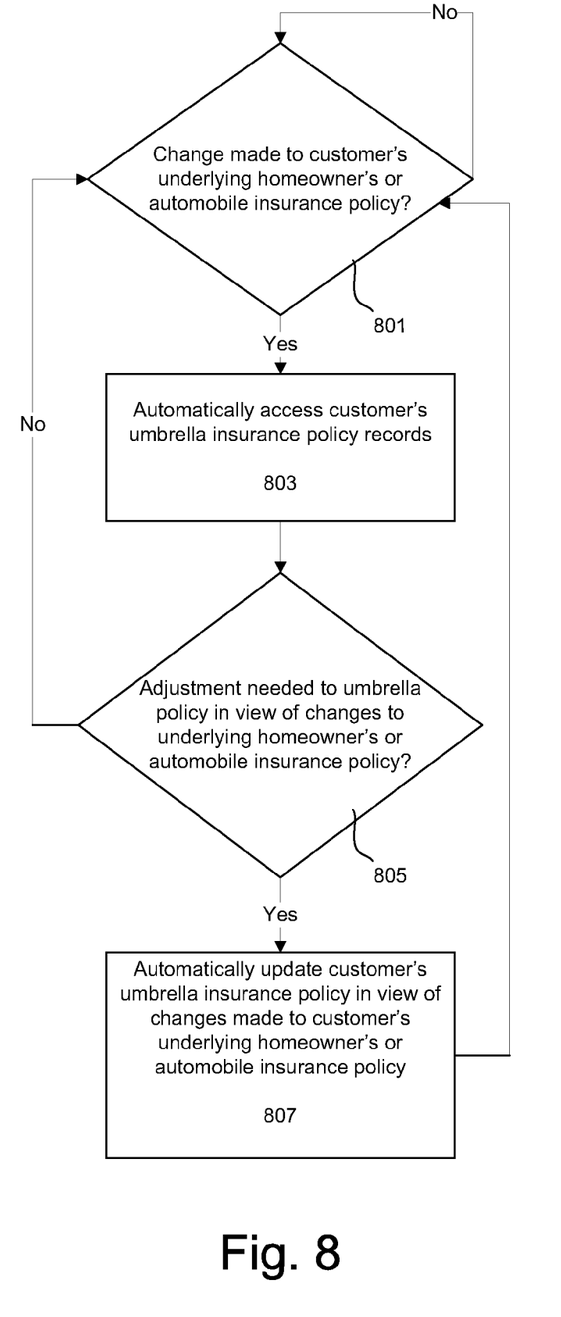
FIG. 8 is a flowchart illustrating an example process for automatically updating a customer's existing umbrella insurance policy based on changes to the customer's underlying insurance policies.

Referring next to FIG. 8, shown is a flowchart illustrating an example process for automatically updating a customer's existing umbrella insurance policy based on changes to the customer's underlying insurance policies. First, it is automatically determined 801 whether a change has been made to the customer's underlying homeowner's or automobile insurance policy. For example, this change may have been made by the customer adding or removing a vehicle or home from a policy, changing coverage amounts, changing risk factors, etc. These changes may be detected by computerized systems of the insurance company or other service provider with access to insurance records of the customer.

If a change has been made, then the customer's umbrella insurance policy records are automatically accessed 803. It is then automatically determined 805 whether an adjustment is needed to the customer's current umbrella policy in view of the changes to the customer's underlying homeowner's or automobile insurance policy. For example, if the customer adds a vehicle or home to their underlying insurance policy or policies, then additional umbrella coverage based on that additional vehicle or home added may be needed. If an adjustment is needed to the customer's current umbrella policy in view of the changes to underlying homeowner's or automobile insurance policy, then customer's umbrella insurance policy is automatically updated 807 in view of the changes made to customer's underlying homeowner's or automobile insurance policy. These automatic updates may have been preauthorized by the customer and may be performed by computerized systems of the insurance company accessing and updating the umbrella insurance records of the customer. Additionally, the policy changes may then be automatically communicated to the customer and/or reflected in the customer's next insurance billing statement.

It is noted that the foregoing examples have been provided merely for the purposes of explanation and are in no way to be construed as limiting of the present invention. While the invention has been described with reference to various embodiments, it is understood that the words which have been used herein are words of description and illustration, rather than words of limitations. Further, although embodiments have been described herein with reference to particular means and materials, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. A non-transitory computer readable medium for providing an umbrella insurance policy comprising computer executable instructions for:
    collecting information regarding a customer's household;
    automatically accessing existing underlying insurance policy records of the customer;
    automatically displaying to the customer one or more pieces of automatically accessed information regarding the underlying insurance policies of the customer and, in response receiving verification from the customer that the information is valid;
    assigning scores to each of a number of attributes related to the collected information regarding the customer's household and the automatically accessed information regarding the underlying insurance policies;
    automatically placing the customer into a tier based on each of the scores; and
    automatically deciding a disposition of an umbrella policy application based on the customer's tier.

2. The computer readable medium of claim 1, wherein the disposition of the customer's umbrella policy application is one of acceptance of the application, referral of the application for further underwriting review, or denial of the application.

3. The computer readable medium of claim 1, wherein the computer executable instructions for automatically accessing the customer's existing underlying insurance policy records comprise computer executable instructions for:
    automatically accessing existing automobile insurance records of the customer if the customer has existing automobile insurance records; and
    automatically accessing existing homeowner's insurance records of the customer if the customer has existing homeowner's insurance records.

4. The computer readable medium of claim 1, wherein the computer executable instructions for collecting information comprise computer executable instructions for collecting information from the customer through an interactive electronic interface and wherein the information comprises one or more of the following types of information: age of people within the customer's household, credit score of the customer, insurance credit score of the customer, number of products the customer holds with an insurance company, how long the customer has been a customer of the insurance company, exposures of the customer regarding the underlying insurance coverage, vehicles in storage of the customer, farm exposure of the customer, animal liability of the customer, information regarding oil tanks of the customer, vehicles or properties of the customer used in business, driving record of the customer and others in the customer's household, information regarding litigation the customer has been involved in, open or closed liability claims against the customer, claims history of customer's automobile, homeowner's, renter's, fire, watercraft and umbrella insurance, number of rental properties of the customer, whether the customer races vehicles or watercraft, whether there is unsupervised use of motorized watercraft by minors, information regarding the ownership or use of high-powered boats, information regarding non-owned automobile of the customer, whether the customer or customer's household member is high profile or of high social status, information regarding dog breeds within the household, information regarding swimming pools of the customer, information regarding trampolines of the customer, and information regarding an underwriting relationship of the customer to the insurance company.

5. The computer readable medium of claim 1, further comprising computer executable instructions for:
automatically calculating a premium quote for the umbrella insurance policy if the disposition of the application is one of acceptance; and
automatically displaying the premium quote to the customer for acceptance by the customer.

6. The computer readable medium of claim 1, further comprising computer executable instructions for:
automatically displaying a message to the customer to contact a customer service representative if the disposition of the application is not one of acceptance; and
automatically referring the application for further underwriting review if the disposition of the application is one of referral for further underwriting review.

7. A non-transitory computer readable medium for providing an umbrella insurance policy comprising computer executable instructions for:
assigning scores to each of a number of attributes related to customer information gathered from accessed existing customer records and answers provided by the customer through an electronic interface;
automatically placing the customer into a tier based on each of the scores;
automatically calculating an umbrella policy quote based on the customer's tier;
displaying the umbrella insurance policy quote electronically to the customer with umbrella coverage amount options;
receiving the customer's electronic acceptance of the quote;
automatically issuing the umbrella insurance policy based on the received acceptance; and
receiving preauthorization from the customer to automatically update the umbrella insurance policy in response to future changes to an underlying homeowner's or automobile insurance policy.

8. The computer readable medium of claim 7, further comprising computer executable instructions for determining whether the customer has selected to change a coverage amount based on the coverage amount options.

9. The computer readable medium of claim 8, further comprising computer executable instructions for automatically displaying a revised umbrella insurance policy quote to the customer if the customer has selected to change the coverage amount based on the coverage amount options.

10. The computer readable medium of claim 9, wherein the computer executable instructions for automatically displaying the revised quote comprise computer executable instructions for:
calculating the revised umbrella insurance policy quote based on the coverage amount selected from the coverage amount options; and
providing the revised umbrella insurance policy quote amount so that it is visible on an electronic interface used by the customer to select the coverage amount.

11. The computer readable medium of claim 9, wherein the computer executable instructions for automatically displaying a revised quote comprise computer executable instructions for:
selecting a revised umbrella insurance policy quote that was pre-calculated based on the coverage amount options; and
providing the revised umbrella insurance policy quote amount so that it is visible on an electronic interface used by the customer to select the coverage amount.

12. The computer readable medium of claim 7, further comprising computer executable instructions for:
automatically accessing existing underlying insurance policy records of the customer once the electronic acceptance of the umbrella insurance policy quote is received;
automatically determining current underlying coverage and required underlying coverage amounts of the customer based on the automatically accessing of existing underlying insurance policy records; and
automatically displaying current underlying coverage and required underlying coverage amounts to the customer.

13. The computer readable medium of claim 12, further comprising computer executable instructions for receiving electronic acceptance from the customer of the required underlying coverage amounts before the automatic issuing of the umbrella insurance policy.

14. A non-transitory computer readable medium for determining a disposition of an application for an umbrella insurance policy comprising computer executable instructions for:
automatically gathering customer information from accessed existing customer insurance records;
automatically gathering customer information from answers provided by the customer through a provided electronic interface;
automatically displaying to the customer via the electronic interface one or more pieces of accessed existing customer information and, in response, receiving verification from the customer that the existing customer information is valid;
assigning scores to each of a number of attributes related to the gathered information;
automatically placing the customer into a tier based on each of the scores; and automatically determining a disposition of the application for an umbrella insurance policy based on the tier.

15. The computer readable medium of claim 14, wherein the disposition of the customer's umbrella policy application is one of acceptance of the application, referral of the application for further underwriting review, or denial of the application.

16. The computer readable medium of claim 14, wherein the computer executable instructions for automatically gathering information from accessed existing customer insurance records comprise computer executable instructions for:
   automatically gathering customer information from accessed existing automobile insurance records of the customer if the customer has existing automobile insurance records; and
   automatically gathering customer information from accessed existing homeowner's insurance records of the customer if the customer has existing homeowner's insurance records.

17. The computer readable medium of claim 14, wherein the customer information comprises one or more of the following types of information: age of people within the customer's household, credit score of the customer, insurance credit score of the customer, number of products the customer holds with an insurance company, how long the customer has been a customer of the insurance company, exposures of the customer regarding the underlying insurance coverage, vehicles in storage of the customer, farm exposure of the customer, animal liability of the customer, information regarding oil tanks of the customer, vehicles or properties of the customer used in business, driving record of the customer and others in the customer's household, information regarding litigation the customer has been involved in, open or closed liability claims against the customer, claims history of customer's automobile, homeowner's, renter's, fire, watercraft and umbrella insurance, number of rental properties of the customer, whether the customer races vehicles or watercraft, whether there is unsupervised use of motorized watercraft by minors, information regarding the ownership or use of high-powered boats, information regarding non-owned automobile of the customer, whether the customer or customer's household member is high profile or of high social status, information regarding breeds of dogs within the household, information regarding swimming pools of the customer, information regarding trampolines of the customer, and information regarding an underwriting relationship of the customer to the insurance company.

18. The computer readable medium of claim 14, further comprising computer executable instructions for:
   assigning different values to different pieces of information gathered as they are applicable to the customer;
   adding the different values together to obtain a total customer score; and
   automatically determining the disposition of the application for the umbrella insurance policy based on the tier and the total customer score.

19. The computer readable medium of claim 14, further comprising computer executable instructions for:
   automatically displaying a message to the customer to contact a customer service representative if the disposition of the application is not one of acceptance; and
   automatically referring the application for further underwriting review if the disposition of the application is one of referral for further underwriting review.

20. The computer readable medium of claim 14, wherein the computer executable instructions for automatically gathering customer information from accessed existing customer insurance records comprise computer executable instructions for automatically gathering customer information regarding assets of underlying insurance policies of the customer from the accessed existing customer insurance records based on a customer identifier.

21. A non-transitory computer readable medium for calculating a premium quote for an umbrella insurance policy comprising computer executable instructions for:
   automatically gathering customer information from accessed existing customer insurance records;
   automatically gathering customer information from answers provided by the customer through a provided electronic interface;
   automatically calculating a customer tier level value by assigning scores to each of a number of attributes related to the gathered customer information;
   automatically calculating the umbrella insurance policy premium quote based on the customer tier level; and
   receiving preauthorization from the customer to automatically update the umbrella insurance policy in response to future changes to an underlying homeowner's or automobile insurance policy.

22. The computer readable medium of claim 21, further comprising computer executable instructions for calculating at least one additional umbrella insurance policy premium quote based on a predetermined optional amount of coverage.

23. The computer readable medium of claim 21, wherein the computer executable instructions for automatically gathering information from accessed existing customer insurance records comprise computer executable instructions for:
   automatically gathering customer information from accessed existing automobile insurance records of the customer if the customer has existing automobile insurance records; and
   automatically gathering customer information from accessed existing homeowner's insurance records of the customer if the customer has existing homeowner's insurance records.

24. The computer readable medium of claim 21, wherein the customer information comprises one or more of the following types of information regarding the customer: insurance credit score, military status, military commission source, military rank, collateral of the customer held by an insurance company providing the quote or bank associated with the insurance company providing the quote, prior auto insurance lapses, umbrella insurance tenure with the insurance company providing the quote, auto insurance tenure with the insurance company providing the quote, and whether the customer owns a home.

25. The computer readable medium of claim 21, wherein the computer executable instructions for automatically gathering customer information from accessed existing customer insurance records comprise computer executable instructions for automatically gathering customer information regarding assets of underlying insurance policies of the customer from the accessed existing customer insurance records based on a customer identifier.

26. The computer readable medium of claim 21, wherein the attributes related to the gathered customer information are those that increase or decrease a risk of insuring the customer.

27. A system implemented on one or more computer processors for updating a current umbrella insurance policy comprising:
   at least one subsystem configured for automatically determining whether a change has been made to a customer's underlying homeowner's or automobile insurance policy;

at least one subsystem configured for automatically determining whether an adjustment is needed to the current umbrella insurance policy of the customer in view of any changes to the customer's underlying homeowner's or automobile insurance policy;

at least one subsystem configured to receive preauthorization from the customer to automatically update an umbrella insurance policy in response to future changes to the customer's underlying homeowner's or automobile insurance policy; and at least one subsystem configured for automatically updating, in accordance with the customer's preauthorization, the customer's current umbrella insurance policy in view of any changes made to the customer's underlying homeowner's or automobile insurance policy if it is determined that an adjustment is needed to the customer's current umbrella insurance policy in view of any changes to the customer's underlying homeowner's or automobile insurance policy, wherein a policy premium of an updated umbrella insurance policy of the customer is based on a customer tier level determined using scores assigned to a number of attributes related to customer information.

28. The system of claim 27, wherein the at least one subsystem configured for automatically determining whether an adjustment is needed to the current umbrella insurance policy comprises:

at least one subsystem configured for automatically accessing existing umbrella insurance policy records of the customer;

at least one subsystem configured for automatically determining current coverage amounts of the umbrella insurance policy; and at least one subsystem configured for automatically determining whether additional coverage is needed or less coverage is required in the current umbrella insurance policy to account for any changes in the customer's underlying homeowner's or automobile insurance policy.

29. The system of claim 27, wherein the at least one subsystem configured for automatically determining whether a change has been made to the customer's underlying homeowner's or automobile insurance policy comprises:

at least one subsystem configured for accessing underlying homeowner's or automobile insurance policy records of the customer; and at least one subsystem configured for comparing old and new data within the accessed homeowner's or automobile insurance policy records of the customer to determine whether the old and new data matches.

30. The system of claim 27, wherein the at least one subsystem configured for automatically updating the customer's current umbrella insurance policy in view of the changes made to the customer's underlying homeowner's or automobile insurance policy comprises at least one subsystem configured for increasing coverage in the umbrella insurance policy if any changes in the underlying insurance policy require such increase for the umbrella insurance policy to be in effect.

31. The system of claim 30, further comprising at least one subsystem configured for decreasing coverage in the umbrella insurance policy if any changes in an underlying insurance policy do not require such a large amount of coverage in the umbrella insurance policy for it to be in effect.

32. The system of claim 30, further comprising at least one subsystem configured for changing a type of coverage in the umbrella insurance policy if any changes in the underlying insurance policy require different types of coverage in the umbrella insurance policy for it to be in effect.

* * * * *

UNITED STATES PATENT AND TRADEMARK OFFICE
CERTIFICATE OF CORRECTION

| | | |
|---|---|---|
| PATENT NO. | : 8,428,972 B1 | Page 1 of 1 |
| APPLICATION NO. | : 12/474585 | |
| DATED | : April 23, 2013 | |
| INVENTOR(S) | : Noles et al. | |

It is certified that error appears in the above-identified patent and that said Letters Patent is hereby corrected as shown below:

On the Title page, third inventor's name has been misspelled.

Delete "Marilyn A. Dworacyk, Poth, TX (US)", and insert:

--Marilyn A. Dworaczyk, Poth, TX (US)--

Signed and Sealed this
Seventeenth Day of February, 2015

Michelle K. Lee
*Deputy Director of the United States Patent and Trademark Office*